Oct. 17, 1967 H. SCHLÜTER 3,347,994

SWITCHING REED RELAY MATRIX HAVING UNIQUE RELEASING MEANS

Filed July 13, 1964 2 Sheets-Sheet 1

SWITCHING REED RELAY MATRIX HAVING UNIQUE RELEASING MEANS

United States Patent Office 3,347,994
Patented Oct. 17, 1967

3,347,994

SWITCHING REED RELAY MATRIX HAVING UNIQUE RELEASING MEANS

Heinz Schlüter, Kornwestheim, Wurttemberg, Germany, assignor to International Standard Electric Corporation, New York, N.Y., a corporation of Delaware Filed July 13, 1964, Ser. No. 382,298
Claims priority, application Germany, July 24, 1963, St 20,898
3 Claims. (Cl. 179—18)

ABSTRACT OF THE DISCLOSURE

A switching network using crosspoint matrices. The switching elements comprise reed relays having magnetizable contacts.

This invention relates to switching networks and more particularly to switching crosspoint matrices comprising magnetizable relay contacts.

Known networks of relay contacts extend switch paths from a calling to a called line. Typically, these contacts may be glass reed types of devices which use the remanence of the magnetic circuit to maintain the last operated condition of the contacts. The type of reed relay is said to have "adhesive" properties. That is, a current impulse of one polarity first operates and then magnetizes the crosspoints so that they hold themselves in a closed position. A current impulse of opposite polarity demagnetizes the contacts so that they release themselves. Thus, no power is required to hold the switch path after it is established. However, these known networks do require a memory storage device for applying the release potentials to the crosspoints which are to be released.

Accordingly, an object of the invention is to provide a network of adhesive contacts which do not require additional memory circuits for identifying operated crosspoints. Thus, an object is to reduce the cost of systems by eliminating the controls therefor.

In accordance with an aspect of the invention, these and other objects are achieved by a set of magnetizable contacts forming a crosspoint. When the crosspoint is operated, a control conductor associated with the crosspoint is disconnected from the next following stage in the network. To release a switch path through the network, a pulse is applied to the control conductor at one end of the network. This pulse releases the first crosspoint which connects the control conductor to the crosspoint in the next cascaded stage. The release potential is thus applied over the control conductor to release the switch path stage-by-stage.

The above mentioned and other features of this invention and the manner of obtaining them will become more apparent, and the invention itself will be best understood by reference to the following description of an embodiment of the invention taken in conjunction with the accompaying drawings, in which.

Figure 1:
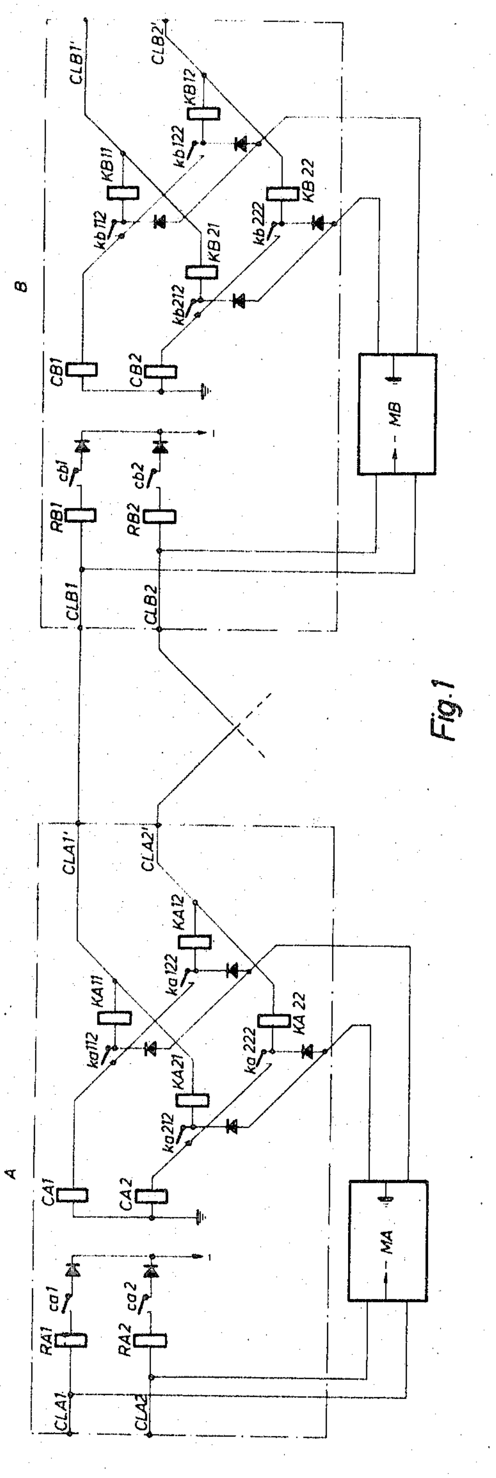
FIG. 1 is a schematic showing of a prior art switching network comprised of a pair of cascaded stages which require holding current to maintain established paths.

Each figure shows only those parts of the network which are essential to an understanding of the invention. For example, every crosspoint will have both talking and control conductors. But, only the control conductor is important to the invention; therefore, only the control conductor is shown. Moreover, those skilled in the art known "sleeve" conductors. To establish a switch path, and memory storage devices. Thus, the markers and storage devices are shown by hollow boxes only.

Each figure shows two cascaded stages of a multistage network. In each stage, only two crosspoint multiples are shown; however, any number may be provided. The first stage has the letter A in the associated reference characters. The second stage has the letter B in the associated reference characters. The letter C is used in the reference characters to identify control conductors, such as the well known "sleeve" conductors. To establish a switch path, the marker first sets a crosspoint in stage B. Thereafter it sets a crosspoint in stage A.

In FIG. 1, the circuit (not shown) connected to the terminal CLB1 applies a negative potential to that terminal when it wants a switch path. The marker MB selects a crosspoint in the marked multiple; for example, the marker may extend a marking up the column connected to the left-hand side of relay KB11, which operates. Contacts *kb*112 close a holding path and operate relay CB1. At the same time, the marker MB also applies a negative voltage signal to an idle multiple in the A network. For example, this marking could be applied to the point CLB1 and, therefore, to the point CLA1′.

The marker MA selects an idle column in network A and applies a positive potential thereto. This coincidence could operate relay KA11, for example. Responsive thereto, contacts *ka*112 closes to complete a holding circuit which extends through the winding of relay RB1 and contacts *cb*1 on relay CB1. The relay RB1 operates and closes contacts (not shown) to indicate the busy condition of the crosspoint. When contacts *ka*112 close, relay CA1 operates, contacts *ca*1 close and later relay RA1 operates to perform functions comparable to those of relay CB1, contacts *cb*1, and relay RB1, respectively.

The talking path is completed at contacts (not shown) which are controlled by relays KB11 and KA11.

To release an existing connection, the negative potential is removed by the circuit connected to the terminal CLB1′. The relays KB11 and CB1 release. Contacts *cb*1 open and release relays RB1, KA11, and CA1. This opens crosspoint KA11 and repeats the negative release potential to the next circuits.

The disadvantage of this prior art system is that when it is closed, the crosspoint requires a constant supply of power to hold the various crosspoint relays operated. Thus, to avoid the power drain, prior art devices have used "adhesive" crosspoint contacts which are magnetized when closed. Such an arrangement is shown in FIG. 2.

Figure 2:
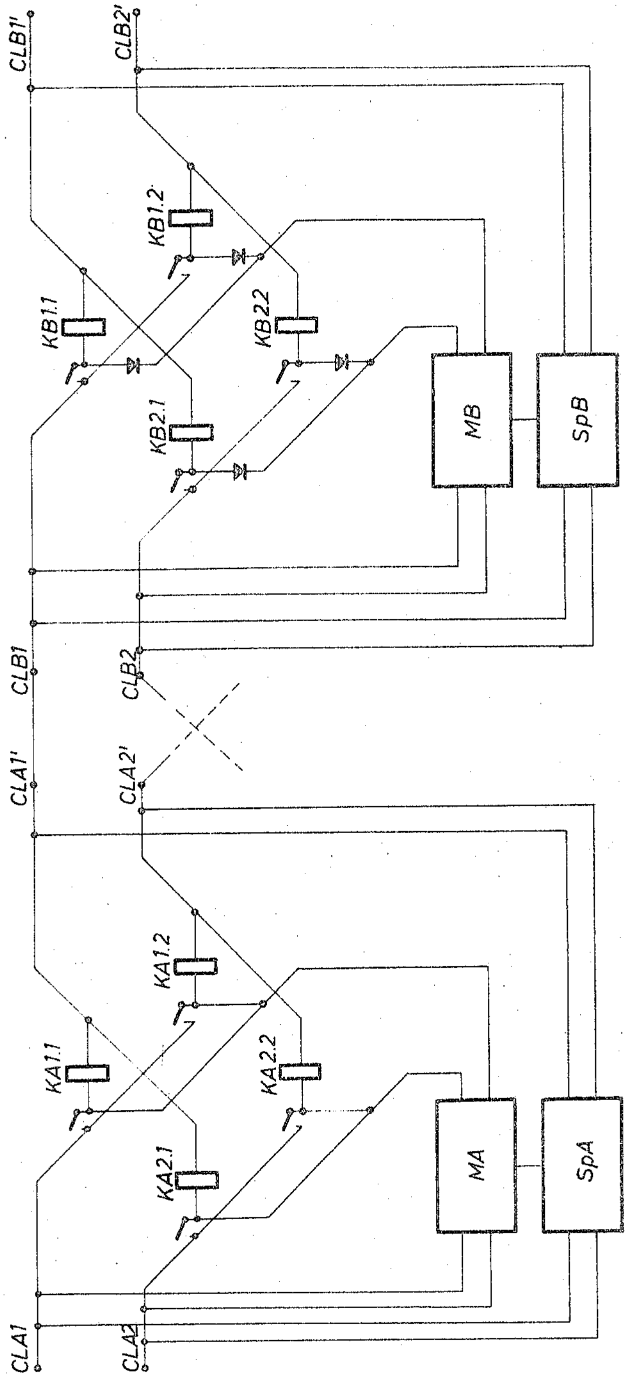
FIG. 2 is a schematic showing of another prior art network having adhesive crosspoints and requiring a memory storage for release.

The circuit of FIG. 2 is similar to the circuit of FIG. 1 except that a number of parts are omitted because their function is provided by the adhesiveness of the contacts. The parts which have been omitted and the operation of FIG. 2 should be apparent by a visual comparison of FIG. 1 with 2. When coil KB1.1 is energized by current in one direction, the associated contacts are magnetized and stick together. When energized by current in an opposite direction, the contacts are demagnetized and released.

In FIG. 2, a storage device Sp*A* and Sp*B* is associated with each marker. When a path is established, a memory of the crosspoints selected to be in the path is stored in the memory devices SpA, SpB. When the connection is ready to be released, the marker signals the storage devices SpA and SpB and identifies the path that is to be released. Then the storage devices either mark the points such as CLB1, CLB1′ or cause the marker to mark the points. This energizes the coil KB1.1 in a reverse direction to demagnetize the contacts which release.

The obvious disadvantage of this circuit is that the storage devices SpA and SpB are quite expensive.

Figure 3:
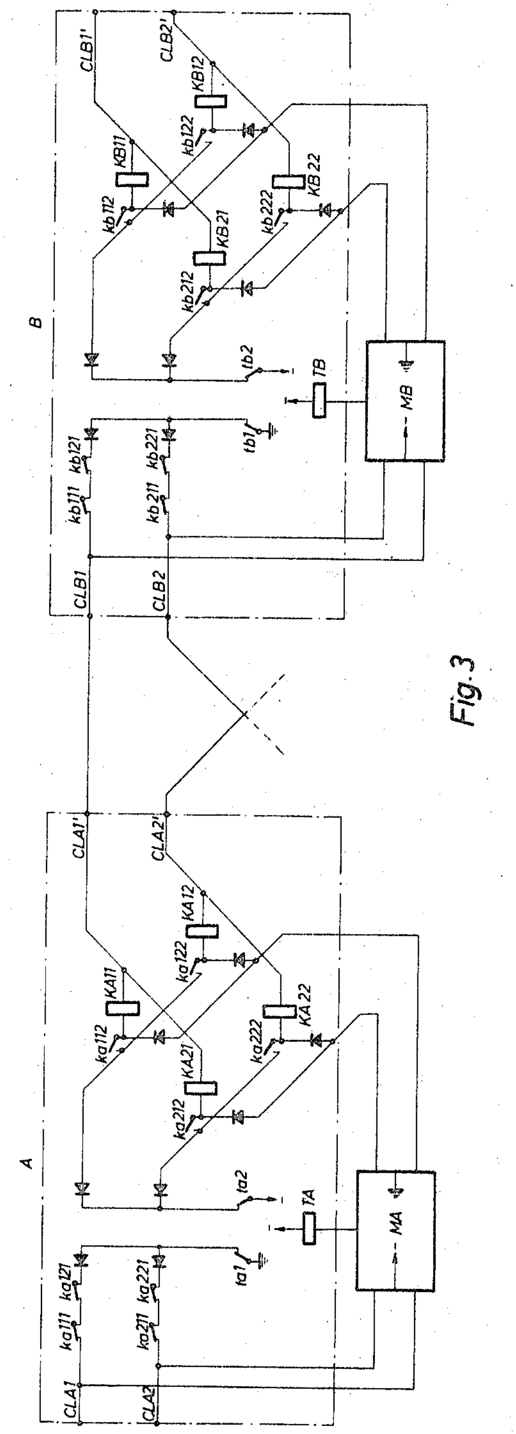
FIG. 3 is a schematic showing of a network embodying the principles of the invention.

In accordance with an aspect of the invention, contacts which adhere due to magnetic remanence are used without requiring the addition of a storage device, as shown in FIG. 3. Before a call is placed, relay TB operates and opens contacts *tb*1, *tb*2. A negative potential is applied to terminal CLB1 to request a switch path. Assuming that the marker selects crosspoints in the extreme right-hand column by grounding the appropriate vertical, relay KB11 is energized. When relay KB11 operates, contacts *kb*112 prepares dropping path that extends to contacts *tb*2 in the open condition and contacts *kb*111 open a point in the control conductor which extends to the preceding stage. Every other crosspoint which can be operated from the point CLB1′ also has a contact (as at *kb*121) for breaking the control conductor leading to stage A.

The marker MB also marks the point CLB1 leading to stage A where the marker MA selects a crosspoint.

When the path is selected, the markers MA and MB switch "off" to release relays TA, TB. This applies battery and ground to the control conductor via contacts *ta*2 and *tb*1. But contacts *kb*111 are open, and there is no effect. In like manner, ground is extended from contacts *ta*1 to open contacts *ka*111. Also, when markers MA, MB switch "off," the winding relays KA11 and KB11 are de-energized. However, the crosspoint contacts are now magnetized and adhere together. Other contacts (not shown) mark the crosspoint as busy.

To release, the circuit (not shown) which originally requested the switch path, applies a ground to the point CLB1′. This reverse energizes the winding of relay KB11 (via contacts *kb*112, *tb* to the negative battery) which demagnetizes its contacts. When the make contacts of relay KB11 such as are so demagnetized, the contacts *kb*112 open to terminate the release pulse. The contacts *kb*111 close and ground is applied over terminals CLB1 and CLA1′ to restore the relay KA11. In this manner, a release pulse is forwarded stage-by-stage through the network. It is not necessary either to supply the continuous holding current as required in FIG. 1 or to provide the memory storage device as required in FIG. 2.

To insure complete release of the crosspoint, the contacts are adjusted so that *kb*112 does not open to terminate the release pulse until after all other of the releasing crosspoint contacts have returned to normal. Also, since the relays TB, TA are operated while the switch paths are being set up, a path can be released only when the markers are not setting paths. While this T relay interlock is preferable, it is not essential to the practice of the invention.

While the principles of the invention have been described above in connection with specific apparatus and applications, it is to be understood that this description is made only by way of example and not as a limitation on the scope of the invention.

I claim:

1. A network of cascaded relay contact matrices comprising crosspoint reed relay contact devices having sufficient remanence to remain magnetized to a current pulse passing through the winding of said relay devices, means responsive to a request for switch path condition for extending a pulse stage-by-stage through said network, means responsive to said pulse for causing the contacts of one of said crosspoint reed relay contact devices in each of said stages to close and adhere thereby completing a switch path through said network, means responsive to the closure of each crosspoint for opening a point in a control conductor associated with said switch path, and means for releasing said switch path by energizing said control conductor to remove said remanent magnetism from said contacts, whereby each crosspoint releases and extends said control conductor to release the next crosspoint in said switch path.

2. The network of claim 1 and means comprising another contact in said crosspoint device for applying the energy from said control conductor to remove said remanent magnetism from said crosspoint said other contact opening to remove said energy from said crosspoint when said remanent magnetism has disappeared.

3. The network of claim 1 and means for normally applying said energy to said control conductor, means for removing said energy while said switch path is being extended through said network, and means effective after said path has been completed and said control conductor has been opened for reapplying said energy to said control conductor to prepare for said release.

References Cited

UNITED STATES PATENTS

| | | | |
|---|---|---|---|
| 3,110,772 | 11/1963 | Hayward | 179—18.7 |
| 3,301,964 | 1/1967 | Erwin | 179—25 |

KATHLEEN H. CLAFFY, *Primary Examiner.*

L. A. WRIGHT, *Assistant Examiner.*